United States Patent [19]

Raab

[11] Patent Number: 4,868,574

[45] Date of Patent: Sep. 19, 1989

[54] ELECTRONICALLY SCANNED RADAR SYSTEM

[75] Inventor: Anthony R. Raab, Waterloo, Canada

[73] Assignee: COM DEV Ltd., Cambridge, Canada

[21] Appl. No.: 119,716

[22] Filed: Nov. 12, 1987

[30] Foreign Application Priority Data

Jul. 16, 1987 [CA] Canada .................................. 542294

[51] Int. Cl.$^4$ ...................... G01S 13/72; H01Q 13/22; H01Q 3/22
[52] U.S. Cl. ...................................... 342/81; 342/157; 342/158; 343/762; 343/777
[58] Field of Search ................. 342/96, 157, 158, 131, 342/117; 343/762, 768, 770, 771, 777

[56] References Cited

U.S. PATENT DOCUMENTS

| | | | |
|---|---|---|---|
| 3,938,149 | 2/1976 | Granthan | 342/157 |
| 3,949,396 | 4/1976 | Cantrell | 342/157 |
| 4,034,374 | 7/1977 | Kruger | 342/157 |
| 4,118,703 | 10/1978 | Williams | 342/157 |
| 4,243,990 | 1/1981 | Nemit et al. | 343/770 X |

OTHER PUBLICATIONS

Goebels, Jr. et al. "Four Independent Beams from a Single Linear Array", IEEE Trans. Ant. Prop., Sep./1965, pp. 683–691.

*Primary Examiner*—Thomas H. Tarcza
*Assistant Examiner*—Gilberto Barron, Jr.
*Attorney, Agent, or Firm*—Daryl W. Schnurr

[57] ABSTRACT

An electronically scanned radar system has a serpentine antenna, with at least two ports. The antenna is physically rotated. Each port has a mixer, transmitter and local oscillator feeding signals to it, the signals of the transmitter and oscillator being synchronized with one another to take advantage of the physical rotation of the antenna. The radar system can be operated in various ways to produce two independent beams simultaneously in a surveillance mode and/or tracking mode at each port. Furthermore, with the use of coupling means, the system can be operated to produce four independent beams at two different frequencies simultaneously. The system can also be operated to produce one or more beams in a surveillance mode and/or one or more beams in a tracking mode at each port. Further, the system can be operated to compensate for the physical rotation of the antenna and can avoid jammers by hopping to another frequency.

13 Claims, 7 Drawing Sheets

FIGURE 1

PRIOR ART

ELECTRONICALLY SCANNED RADAR SYSTEM

BACKGROUND OF THE INVENTION

1. Field of the Invention

This invention relates to electronically scanned radar systems and to methods for near-continuous tracking of targets at the same time as the radar operates in a conventional surveillance mode. In particular, this invention relates to radar systems using a dispersive antenna with a hopped frequency transmitter.

2. Description of the Prior Art

Electronically scanned radar systems are employed in many applications when targets must be tracked using part of the resources (bandwidths, beams, frequencies, etc.) at the same time that the radar system uses its remaining resources to scan the space around it.

In a typical example, the radar system may be required to rotate continuously in azimuth thus providing complete azimuth coverage. Such known radar systems have not been capable of continuous track-while-scan, and have relied on elaborations in the elevation plane such as frequency-scanning or multi-lobed beam structures to provide accurate elevation location. These radar systems have accordingly been used principally in surveillance roles. In cases where close and rapidly approaching targets must be tracked, phased arrays with complex phase-shifting modules have been used. Because of the requirements for narrow pencil beams, the phased arrays have employed large aperture antennas whose radiating and receiving apertures are densely populated by phase-shifting modules. For reasons of scan and sidelobe optimization, these modules must be spaced at not much more than 0.5 wavelength apart. For a 1o×1o pencil beam, there would be required some 14,000 modules, resulting in considerable expense.

It has therefore been desirable for some considerable time to provide a beam steering system in the azimuth plane that can compensate for the conventional rotation of the antenna beam, thereby permitting nearcontinuous track-while-scan, and at the same time permitting an appropriate elaboration of the elevation beam-forming design to provide elevation information of targets.

SUMMARY OF THE INVENTION

It is therefore an object of the invention to provide a radar apparatus in which frequency control is used to direct beams in a variety of modes to compensate for and take advantage of mechanical rotation in azimuth.

It is a more specific object of the invention to use hopped frequencies to control a number of functions which improve the performance of the radar system, especially in the presence of hostile radiating sources, or jammers.

It is a further object of the invention in using highly dispersive feeding elements so that the radar antenna can be used to generate two sets of beams each operating over the full available frequency band by means of the principle of polarization reuse.

An electronically scanned radar system for nearcontinuous tracking of targets and operation of the system in a conventional surveillance mode has a serpentine antenna with radiators and at least two ports. There are coupling means at each alternate bend of the serpentine, each coupling means having two paths, so that a signal entering one path can generate a circularly polarized radiated signal of one hand in one path and a signal entering the other path can generate a circularly polarized signal of the other hand in the other path, said coupling means coupling signals received to said radiators. The antenna is physically rotatable and there is a diplexer for each port to separate the transmit and receive signals of the antenna for each port. There are at least two frequency-hopping transmitters, two mixers and two local oscillators, one transmitter, mixer and oscillator for each port. The antenna is connected to an angle readout to monitor the angle of rotation of the antenna, with means to rotate said antenna. The at least two transmitters are connected to feed signals of varying frequency to the antenna as the antenna rotates. Each transmitter is connected to receive an output from the angle readout. A high power amplifier is connected to the output of each transmitter. The transmitter, mixer and oscillator for each port is connected to operate as follows:

an echo from the signal of the transmitter is fed from the antenna and the mixer that is connected to receive a drive signal of varying frequency from the local oscillator. The oscillator is synchronized with the transmitter to adjust the frequency of the signals being sent to the mixer. The mixer continuously mixes the signals from the oscillator and transmitter to produce one output signal having a constant intermediate frequency-difference. The frequency of the signals from the local oscillator and transmitter are continuously adjusted based on the angle readout output value to control an angle of the beam being produced relative to the physical rotation of the antenna, there are means for receiving, processing, controlling and displaying said beams, the system producing two independent beams at two different frequencies, said beams being completely independent from one another with respect to angle, one beam being in an azimuth plane.

A method is provided for operating a radar system having a serpentine antenna with radiators and two ports. The antenna is physically rotatable with a diplexer for each port to separate, transmit and receive signals. The antenna is connected to an angle readout to monitor the angle of rotation of the antenna. There are two frequency-hopping transmitters, two mixers and two local oscillators, one transmitter, mixer and oscillator for each port. The two transmitters are connected to feed signals of varying frequency to the antenna. As the antenna rotates, each transmitter is connected to receive an output from the angle readout, the transmitter, mixer and oscillator for each port being connected to operate as follows:

an echo of the signal from each transmitter is fed from the antenna to the mixer, there being one mixer for each transmitter. Each mixer is connected to receive a drive signal of varying frequency from the local oscillator, there being one local oscillator for each mixer. The antenna has a series of loops and bends with bi-directional coupling means at every alternate bend, said coupling means each having two paths. The oscillator and transmitter for each mixer is synchronized with one another to adjust the frequency of signals being sent to the mixer. Each mixer continuously mixes the signals from the oscillator and transmitter to produce one output signal having a constant intermediate frequency difference. The frequency of the signals is continuously adjusted from the local oscillator and transmitter based on the angle readout output value to control an angle of the beam being produced relative to the physical rotation of the antenna,
the radiators are located adjacent to the coupling means. The method comprises operating the radar system to generate at least two completely independent beams simultaneously at each port by causing said coupling means to couple signals received to said radiators.

BRIEF DESCRIPTION OF THE DRAWINGS

The invention will be better understood by an examination of the following description, together with accompanying drawings, in which.

DESCRIPTION OF A PREFERRED EMBODIMENT

Figure 1:
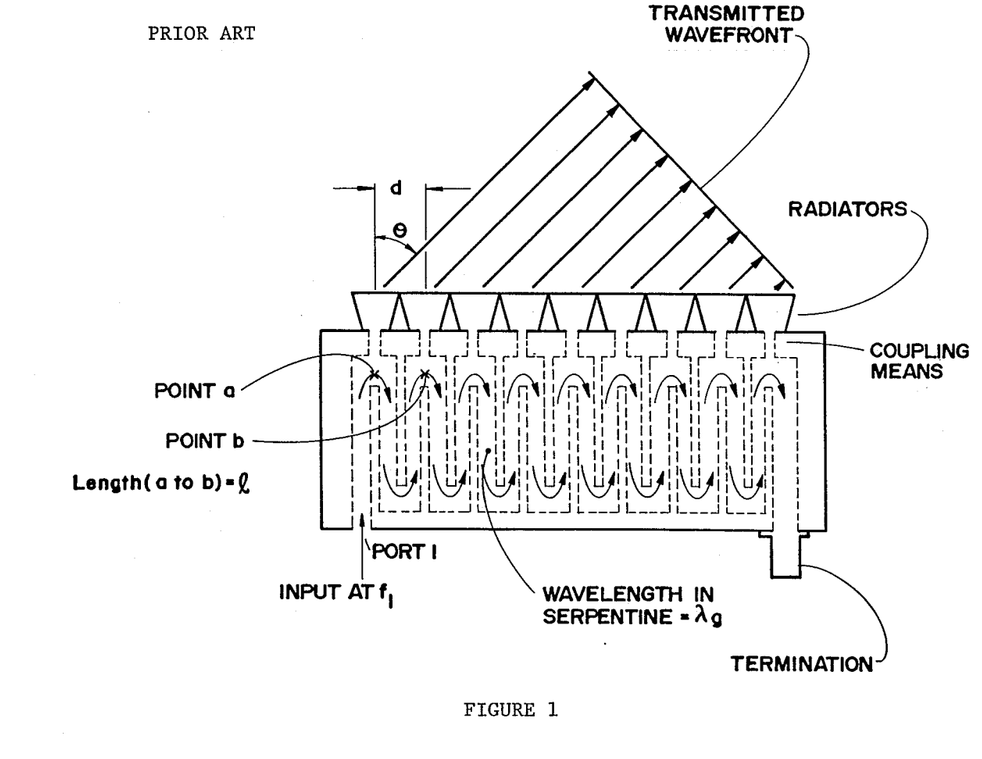
FIG. 1 is a schematic side view of a prior art serpentine antenna with each loop designated by dotted lines.

Referring to FIG. 1, a prior art frequency-scanning antenna is illustrated. Scanning of a beam from radiators (referred to as transmittal wavefront in FIG. 1) is caused by a change of the transmitted frequency input at $f_1$. Due to the dispersive nature of the antenna, the phase of the excitation of the radiators changes in such a way that the transmitted wavefront is plane and inclined at an angle $\theta$ to the antenna's normal direction determined in accordance with the following:

$$\theta = \arcsin\left[\frac{1}{\lambda g} - n\right] \cdot \frac{2\pi}{d}$$

where l is the length of a single loop of the antenna (i.e. the distance along the loops between points 'a' and 'b'); $\lambda g$ is the wavelength in a particular medium; n is the number of whole wavelengths in the quotient $1/\lambda g$; d is the distance between adjacent loops (i.e. the direct distance between points 'a' and 'b').

Since $\theta$ is a function of $\lambda g$, it follows that it is also a function of frequency. Due to the principle of reciprocity, the antenna of FIG. 1 can be operated to most efficiently receive signals at a frequency $f_1$ from the direction $\theta$.

Figure 2:
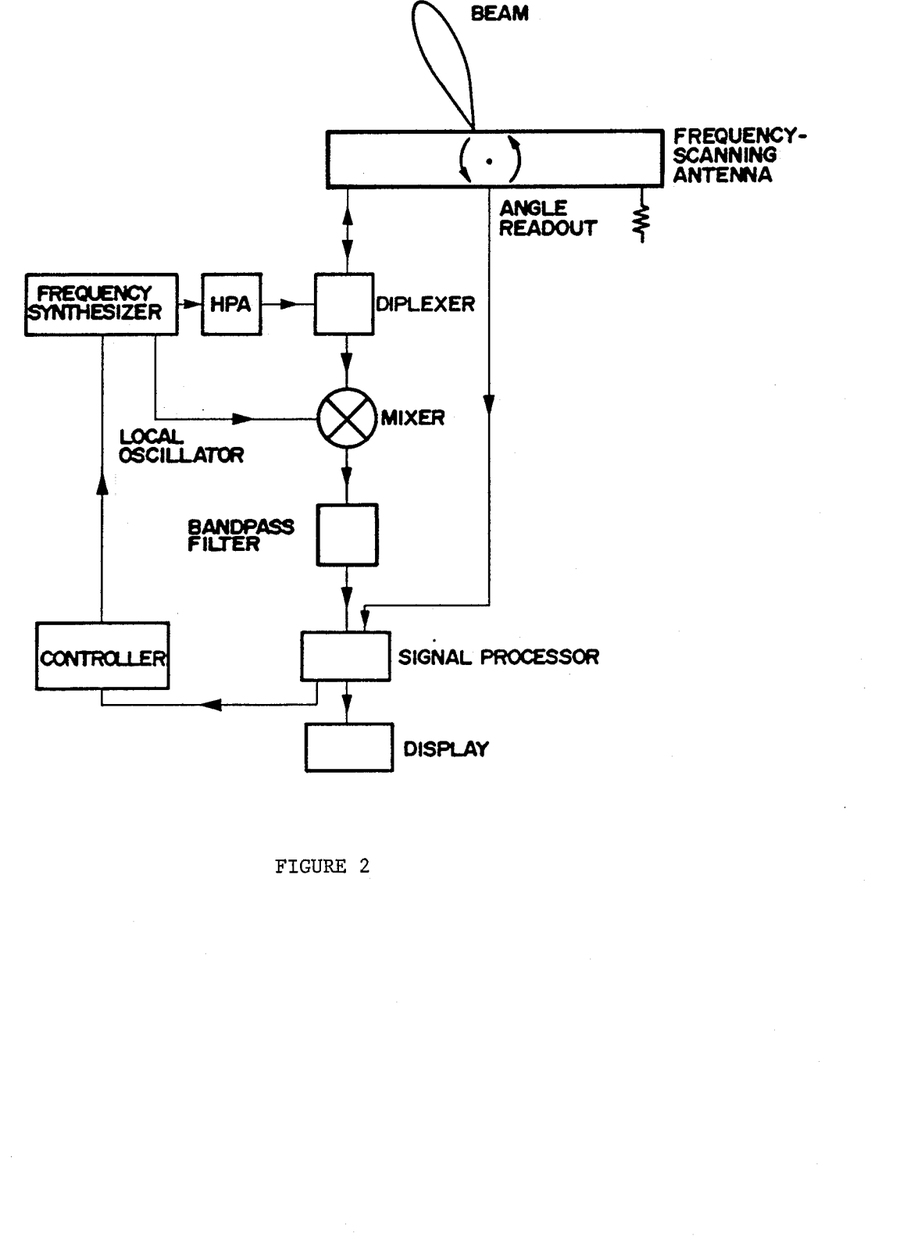
FIG. 2 shows a block diagram of a radar system using a mechanically rotated frequency-scanning antenna having one port.

Considering FIG. 2, a one port frequency-scanning antenna is attached to a mechanically rotating platform equipped with an appropriate mechanism for determining angular position and an angle readout. In a simplified form, there is shown a transmitter-receiver system incorporating a frequency-hopping transmitter (referred to as a frequency synthesizer) capable of sending to the antenna a series of radar pulses in which the centre frequency of each pulse or a sequence of pulse is stepped to scan the beam at the same rate as the mechanical rotation of the platform, but in the opposite direction. The resultant sequential beams, where frequency would be changing, would thus remain fixed in one direction while the platform rotated beneath it. A significant feature of the receiver system is the use of the same frequency-hopping synthesizer to provide the local oscillator drive to the receiver's mixer, thus providing an intermediate frequency independent of beam pointing angle. In other words, the transmitter and the local oscillator are synchronized. Another feature of the receiver system is the use of a bandpass filter to reject other signals from other directions such as hostile jammers.

Figure 3:
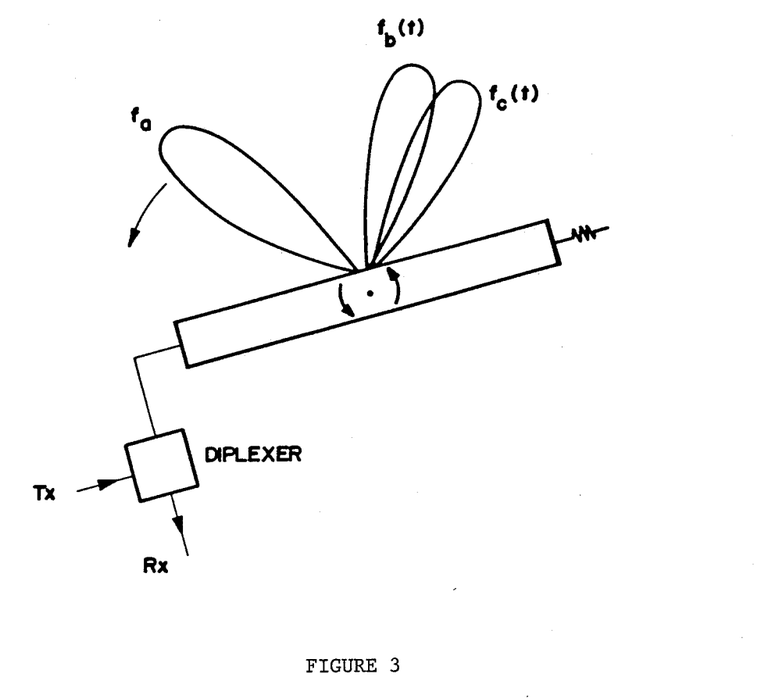
FIG. 3 is a partial block diagram of a radar system using a mechanically rotated frequency-scanning antenna having one port, said system producing three different beams each at a different time and frequency at one polarization.

Referring to FIG. 3, a simplified diagram of a tracking application, a single beam at a fixed frequency $f_a$ is used for continual surveillance. If a jammer is used to jam this beam, it can immediately be hopped to another frequency without loss of surveillance since the jammer has no knowledge of the instantaneous angular position of the rotating platform. Two other beams are shown at two frequencies $f_b(t)$ and $f_c(t)$. These are used to illustrate the way a target may be tracked once acquired by the surveillance beam at $f_a$. By hopping the two frequencies over an appropriate time period, the two associated beams can be steered to left-and-right of the target in a sequential lobing tracking mode, well known in the field of radar.

All other radar functions such as pulse compression by means of chirped transmissions can be incorporated in the system. Furthermore, it is possible to use the inter-pulse period to transmit pulses at other frequencies which can be hopped in synchronism with the rotation of the antenna. In this way, further reuse of the available spectrum can be achieved.

Figure 4:
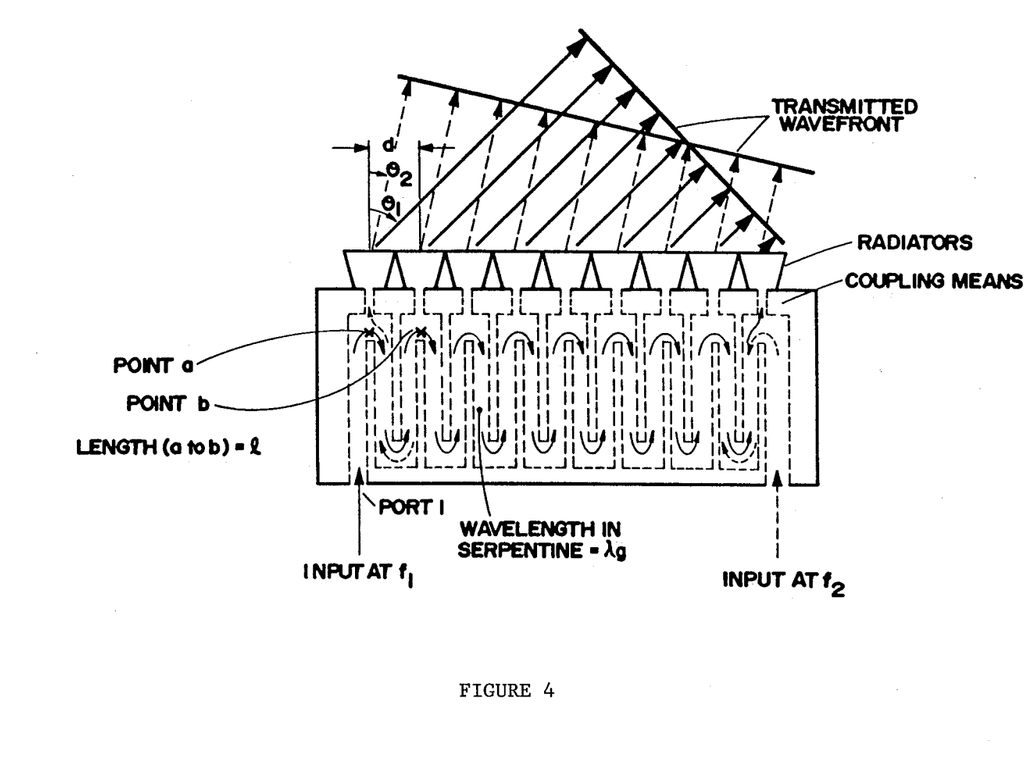
FIG. 4 is a schematic view of a two port serpentine antenna, said antenna producing two independent beams at two different frequencies simultaneously at two polarizations.

A further refinement is shown in FIG. 4 in which the frequency-scanning antenna is used in a two-port mode. Since the antenna is a leaky antenna it is possible to radiate virtualy all of the available power before the signal reaches the far end of the array. In other words, Port one is effectively isolated from Port two. It is therefore possible to use both ports as shown in the figure to generate both surveillance beams and tracking beams in the same way as in FIG. 3, thus doubling the effective radar capability.

Figure 5:
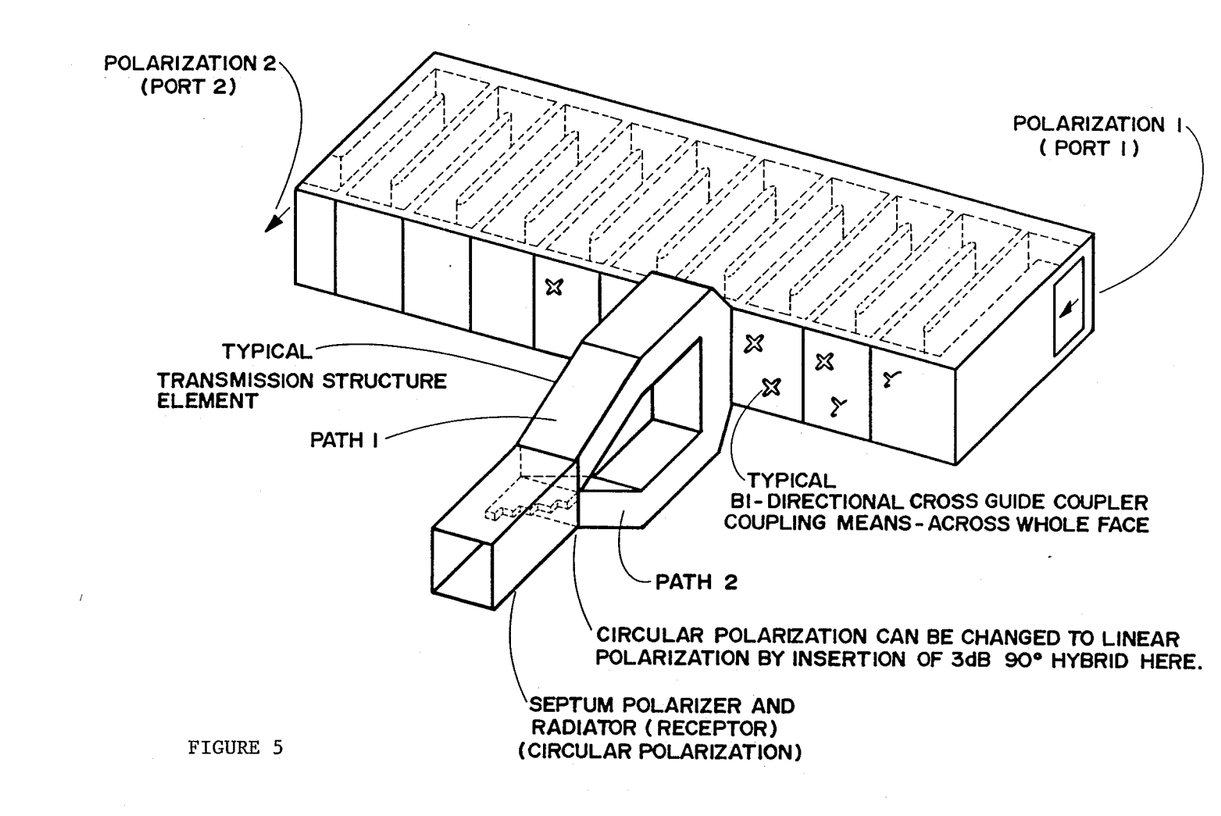
FIG. 5 is a partial perspective view of a two port serpentine antenna having bi-directional coupling means on each loop and a series of transmission structure elements, only one of which is shown in FIG. 5.

Since the Ports one and two are isolated, a further modification may be employed using a bidirectional coupling means as illustrated in FIG. 5. A signal entering, say, Port one will travel through the serpentine, passing at every alternate bend a coupling pair of crosses, a well known waveguide coupling technique. An appropriate small sample will be coupled into Path one of the coupling means, but not sensibly into Path two. The coupling means, which for clarity is shown in detail at only one bend, is repeated at each alternate bend, together with the pairs of crosses which also for clarity are shown only partly. The signal in Path one is then arranged to feed one arm of a polarizer which generates a circularly polarized radiated signal of one hand, as shown. In an exactly similar manner, a signal entering Port two will couple partly into Path two of each of the bi-directional coupling means, then into each of the Path two arms of the polarizer, so causing the radiation of a circularly polarized signal of the opposite hand. In a further modification, a 90° 3 dB hybrid coupler could be introduced as shown in the figure, in which case two orthogonally linearly polarized signals would be radiated by Path one and two respectively.

Figure 6:
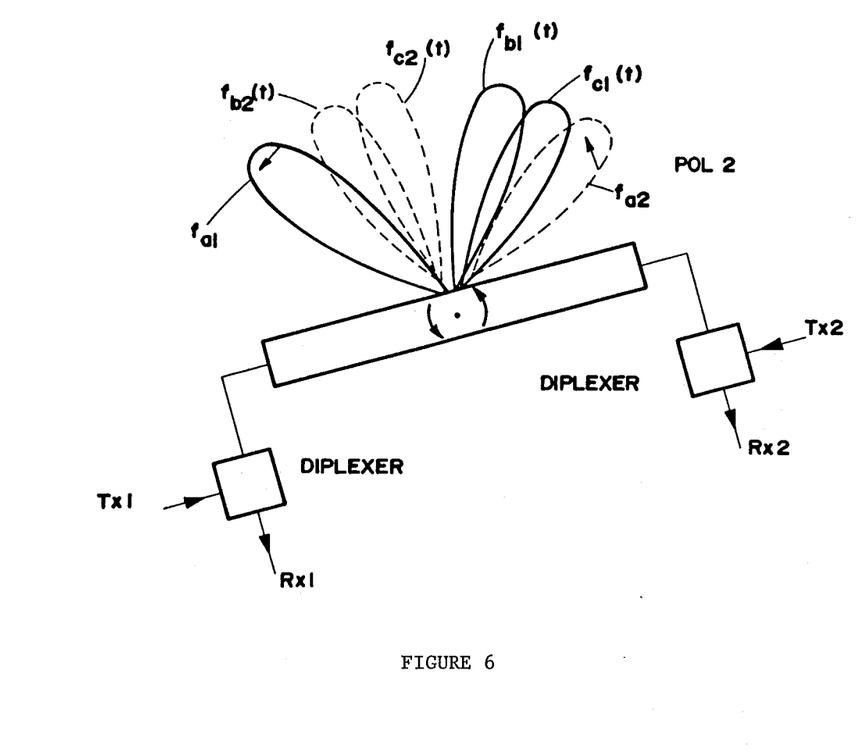
FIG. 6 is a partial block diagram of a radar system using a mechanically rotated frequency-scanning antenna having two ports, said system producing two sets of beams at different frequencies at two polarizations.

By means of the cross-polarization feature of FIG. 5 and the use of tracking beams at different frequencies, it is possible to generate multiple beams of the type illustrated in FIG. 6. This figure shows solid-line beams generated by transmitter Tx1 and Pol 1, received by receiver Rx1 through Port one. A fixed surveillance beam is generated at a fixed frequency $f_{a1}$ and rotates in synchronism with the antenna. $F_{a1}$ can be hopped to different positions if jamming is encountered, without changing its general features of being a fixed surveillance beam. Targets identified by the fixed surveillance beams can then be tracked by fixed-in-space tracking beams at frequencies $f_{b1}$ and $f_{c1}$. These beams are radiated and received at frequencies which vary with time, according to the rotation of the antenna.

In a like manner, Port two can be used to generate a number of beams carrying out similar functions. These beams are shown by dashed lines. A surveillance beam at $f_{a2}$ rotates in synchronism with the antenna, while two fixed-in-space beams at $f_{b2}$ and $f_{c2}$, both of which are functions of time, are used to track targets identified by the surveillance beam.

Figure 7:
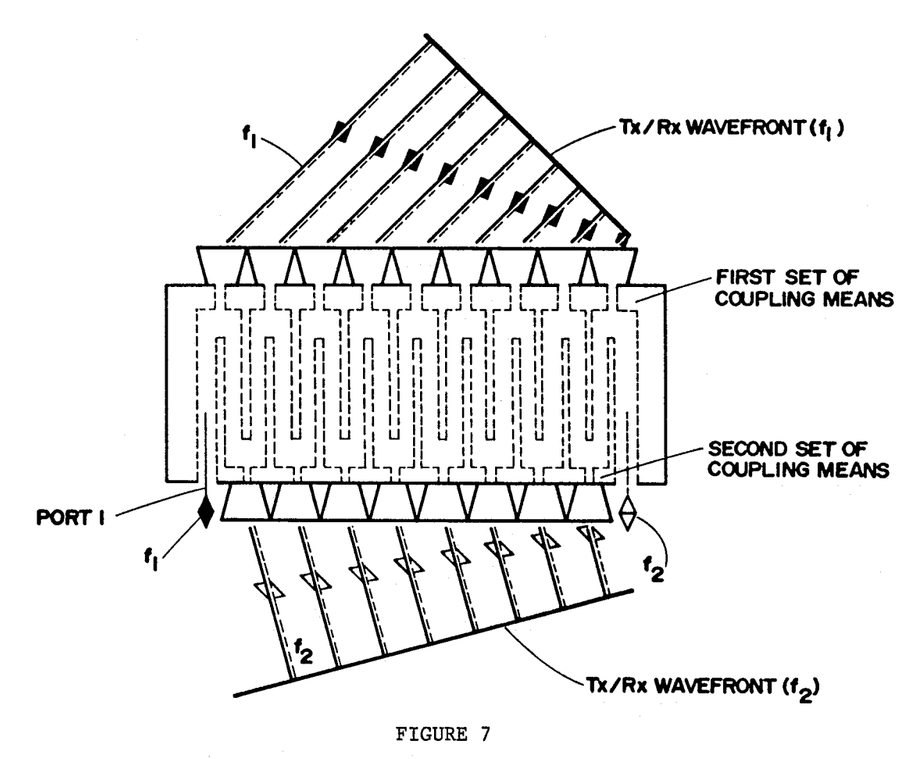
FIG. 7 is a schematic view of a two port serpentine antenna, with coupling means arranged to double the volume of space under surveillance.

FIG. 6 can also be modified to give FIG. 7 in which the same antenna is used to cover both half-planes of azimuth rotation, thus doubling the volume under continual surveillance.

As can be readily understood, the radar system of the present invention is extremely versatile in that the antenna can have one port or two ports, as desired. Where the antenna has one port there will be one transmitter, one local oscillator and one mixer for that port. Where the antenna has two ports, there will be two transmitters, two mixers and two local oscillators, one for each port. The angle readout output will be connected to each transmitter and the system will be capable of producing two completely independent beams at two different frequencies and angles simultaneously, with means for receiving, processing and controlling said beams.

In a further variation of the radar system, the serpentine antenna can have coupling means at each alternate bend of the serpentine, with each coupling means having two paths. Further, the serpentine can have coupling means at each bend with radiators located adjacent to the coupling means so that said coupling means can couple signals to the radiators and the system can produce four independent beams at two different frequencies simultaneously.

The radar system is flexible in its method of operation as well. Where there is one port on the antenna, the system can be operated to produce one beam or, more preferably, operated to produce a series of beams at varying frequencies. For example, the system can be operated in a series of pulses in a surveillance mode, followed by a series of pulses in a tracking mode to the left of the target, followed by a series of pulses in a tracking mode to the right of the target and repeating said operations continuously.

Where the radar system has two ports and, preferably, a serpentine antenna, with one transmitter, one mixer and one local oscillator for each port, the system can be operated to generate a series of beams at each port. This series of beams can take various forms. For example, each port can be operated in a series of pulses in a surveillance mode, followed by a series of pulses in a tracking mode to the left of the target, followed by a series of pulses in a tracking mode to the right of the target and repeating said operations. In a further example, one port can be operated in a series of pulses in a surveillance mode followed by a series of pulses in a tracking mode while the other port is operated in a series of pulses in a tracking mode followed by a series of pulses in a surveillance mode. In other words, one of the two ports is always in a surveillance mode and one is always in a tracking mode. In a further example, one port could be operated in a surveillance mode at all times while the other port is operated in a tracking mode at all times while producing various beams at each port.

Where the radar system has a serpentine antenna with radiators and two ports and also bi-directional coupling means at every alternate bend, said coupling means each having two paths, the system can be operated to generate a series of beams. For example, a circularly polarized radiated signal of the left hand can be generated in one path of the coupling means and a circularly polarized signal of the right hand can be generated in the other path of the coupling means.

In a further example of this version of the radar system, one port can generate a fixed surveillance beam at a fixed frequency and said beam can be made to rotate in synchronism with the antenna. That surveillance beam can identify targets which can then be tracked using fixed-in-space tracking beams at different frequencies at the same port. These tracing beams can be radiated and received at frequencies which vary with time according to the rotation of the antenna. The other port can be operated in a similar manner to generate surveillance beams and tracking beams. Alternatively, surveillance beams could be generated at one port and tracking beams at the other port.

In still another version of the radar system of the present invention, there are coupling means at each bend of the two-port serpentine antenna and radiators are located adjacent to said coupling means. This system can be operated to produce four independent beams at two different frequencies simultaneously. These four beams can cover both half-planes of azimuth rotation. Alternatively the four independent beams could be alternated in surveillance and tracking modes as desired or two surveillance beams could be generated and two tracking beams could be generated.

Although particular embodiments have been illustrated and particular examples have been given, this is for the purpose of describing, but not limiting, the invention. It is apparent that the radar system and the method of operating the radar system of the present invention is extremely flexible and various modifications, within the scope of the attached claims, will readily come to mind to those skilled in the art.

What I claim as my invention is:

1. An electronically scanned radar system for near-continuous tracking of targets and operation of the system in a conventional surveillance mode, said system comprising a serpentine antenna with radiators and at least two ports, there being coupling means at each alternate band of the serpentine, each coupling means having two paths, so that a signal entering one port can generate a circularly polarized radiated signal of one hand in one path and a signal entering the other port can generate a circularly polarized signal of the other hand in the other path, said coupling means coupling signals received to said radiators, said antenna being physically rotatable, with a diplexer for each port to separate the transmit and receive signals of the antenna for each port, there being at least two frequency-hopping transmitters, two mixers and two local oscillators, one transmitter, mixer and oscillator for each port, the antenna being connected to an angle readout to monitor the angle of rotation of the antenna, with means to rotate said antenna, the at least two transmitters being connected to feed signals of varying frequency to the antenna as the antenna rotates, each transmitter being connected to receive an output from the angle readout, a high power amplifier being connected to the output of each transmitter, the transmitter, mixer and oscillator for each port being connected to operate as follows:

an echo of the signal from the transmitter being fed from the antenna and the mixer that is connected to receive a drive signal of varying frequency from the local oscillator, the oscillator being synchronized with the transmitter to adjust the frequency of the signals being sent to the mixer, the mixer continuously mixing the signals from the oscillator and transmitter to produce one output signal having a constant intermediate frequency-difference, continuously adjusting the frequency of signals from the local oscillator and transmitter based on the angle readout output value to control an angle of the beam being produced relative to the physical rotation of the antenna, with means for receiving, processing, controlling and displaying said beams, the system producing two independent beams at two different frequencies, said beams being completely independent from one another with respect to angle, one beam being in an azimuth plane.

2. A radar system as claimed in claim 1 wherein the antenna is a frequency-scanning antenna.

3. A radar system as claimed in claim 2 wherein there is a high power amplifier connected to the output of each transmitter and there are coupling means at each bend of the serpentine, with two groups of radiators located adjacent to the coupling means, one group being located at one end of the serpentine and the other group being located at the other end of the serpentine, said coupling means coupling signals to the group of radiators adjacent to that coupling means, each coupling means having two paths so that a signal entering one path can generate a circularly polarized radiated signal of one hand in one path and a signal entering the other port can generate a circularly polarized radiated signal of the other hand in the other path, so that the system can produce four independent beams at two different frequencies simultaneously, two beams at each port.

4. A radar system as claimed in any one of claims 1, 2 or 3 wherein the system contains one bandpass filter for each port, each bandpass filter being connected in the electronic circuit containing the transmitter, mixer and oscillator for each port, to reduce the possibility of jamming.

5. A method of operating a radar system having a serpentine antenna with radiators and two ports, said antenna being physically rotatable with a diplexer for each port to separate, transmit and receive signals, the antenna being connected to an angle readout to monitor the angle of rotation of the antenna, there being two frequency-hopping transmitters, two mixers and two local oscillators, one transmitter, mixer and oscillator for each port, with the two transmitters being connected to feed signals of varying frequency to the antenna, as the antenna rotates, each transmitter being connected to receive an output from the angle readout, the transmitter, mixer and oscillator for each port being connected to operate as follows:

an echo of the signal from each transmitter being fed from the antenna to the mixer, there being one mixer for each transmitter, each mixer being connected to receive a drive signal of varying frequency from the local oscillator, there being one local oscillator for each mixer, the antenna having a series of loops and bends with bi-directional coupling means at every alternate bend, said coupling means each having two paths, the oscillator and transmitter for each mixer being synchronized with one another to adjust the frequency of signals being sent to the mixer, each mixer continuously mixing the signals from the oscillator and transmitter to produce one output signal having a constant intermediate frequencydifference, continuously adjusting the frequency of signals from the local oscillator and transmitter based on the angle readout output value to control an angle of the beam being produced relative to the physical rotation of the antenna, said radiators being located adjacent to said coupling means, said method comprising operating the radar system to generate at least two completely independent beams simultaneously at each port by causing said coupling means to couple signals received to said radiators.

6. A method as claimed in claim 5 including the steps of generating a circularly polarized radiated signal of one hand in one path of the coupling means and a circularly polarized signal of the opposite hand in the other path of the coupling means.

7. A method as claimed in claim 5 wherein a 90° 3 dB hybrid coupler is introduced into the paths of each coupling means, said method including the step of producing two orthogonally linearly polarized signals using said hybrid coupler, one being radiated by each of the paths of the coupling means.

8. A method as claimed in claim 5 including the steps of operating the system so that one port generates a fixed surveillance beam at a fixed frequency and said beam rotates in synchronism with the antenna, identifying targets using the fixed surveillance beam, tracking said targets using fixed-in-space tracking beams at different frequencies at the same port, said tracking beams being radiated and received at frequencies which vary with time according to the rotation of the antenna, hopping the frequencies used to generate said beams to a different frequency if jamming is encountered and operating the other Port two in a similar manner to generate surveillance beams and tracking beams.

9. A method as claimed in claim 5 including the steps of generating a surveillance beam at one port and a tracking beam at the other port.

10. A method as claimed in claim 5 wherein there are coupling means at each bend of the serpentine and radiators adjacent to said coupling means, said method including the step of operating the system to produce four independent beams at two different frequencies simultaneously.

11. A method as claimed in claim 10 including the step of operating the system to generate four independent beams at two different frequencies to cover both halfplanes of azimuth rotation.

12. A method as claimed in claim 11 including the step of generating four independent beams in alternating surveillance and tracking modes as desired.

13. A method as claimed in claim 10 including the step of operating the system to generate two surveillance beams and two tracking beams.

* * * * *